United States Patent
Sajassi et al.

(10) Patent No.: US 12,245,080 B2
(45) Date of Patent: Mar. 4, 2025

(54) ADAPTIVE LOAD BALANCING IN A SATELLITE NETWORK

(71) Applicant: Cisco Technology, Inc., San Jose, CA (US)

(72) Inventors: Ali Sajassi, San Ramon, CA (US); Arman Rezaee, Seattle, WA (US); Pradeep Kumar Kathail, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 461 days.

(21) Appl. No.: 17/591,026

(22) Filed: Feb. 2, 2022

(65) Prior Publication Data

US 2023/0247484 A1    Aug. 3, 2023

(51) Int. Cl.
*H04W 28/08* (2023.01)
*H04B 7/185* (2006.01)
*H04W 24/10* (2009.01)
*H04W 84/06* (2009.01)

(52) U.S. Cl.
CPC .... *H04W 28/0967* (2020.05); *H04B 7/18521* (2013.01); *H04W 24/10* (2013.01); *H04W 84/06* (2013.01)

(58) Field of Classification Search
CPC .............. H04W 28/08; H04W 28/082; H04W 28/09–0992; H04W 28/0958–0983; H04W 24/10; H04W 84/06; H04B 7/18521; H04B 7/18513; H04B 7/18519; H04B 7/18584
See application file for complete search history.

(56) References Cited

U.S. PATENT DOCUMENTS

| | | | |
|---|---|---|---|
| 2011/0143654 A1 | 6/2011 | Mukhija | |
| 2016/0183126 A1* | 6/2016 | Roy | H04J 3/1694 370/322 |
| 2017/0223572 A1 | 8/2017 | Lee | |
| 2018/0191426 A1 | 7/2018 | Mirra et al. | |
| 2019/0191334 A1* | 6/2019 | Montsma | H04W 28/082 |
| 2020/0007227 A1* | 1/2020 | Becker | H04B 7/19 |
| 2020/0162958 A1 | 5/2020 | Huang-Fu et al. | |
| 2020/0367067 A1 | 11/2020 | Haley et al. | |
| 2021/0376919 A1* | 12/2021 | Lin | H04W 28/0831 |
| 2023/0075345 A1* | 3/2023 | Ravishankar | H04B 7/18521 |

* cited by examiner

*Primary Examiner* — Ricky Q Ngo
*Assistant Examiner* — Kabir U Jahangir
(74) *Attorney, Agent, or Firm* — Baker Botts L.L.P.

(57) ABSTRACT

According to an embodiment, a node comprises one or more processors operable to execute instructions to cause the node to perform operations. The operations comprise determining a link quality associated with each satellite link of a plurality of satellite links and applying load balancing to the plurality of satellite links. The load balancing is based at least in part on the respective link quality associated with each satellite link. The load balancing comprises determining which of the satellite links to include in an active set selected to communicate data to or from the node and, for each satellite link in the active set, determining a portion of the data to communicate via the respective satellite link. The operations further comprise transmitting or receiving the data via the satellite links in the active set. Each satellite link in the active set communicates its respective portion of the data.

20 Claims, 5 Drawing Sheets

ADAPTIVE LOAD BALANCING IN A SATELLITE NETWORK

TECHNICAL FIELD

Certain embodiments relate, in general, to satellite communication and, more specifically, to adaptive load balancing in a satellite network.

BACKGROUND

Several satellite networks have been launched or planned for launch to blanket the Earth's orbits and to provide Internet services to most of the Earth. These satellite networks include the satellites themselves, as well as ground stations and user terminals that communicate with the satellites. For example, ground stations may serve as gateways for connecting user terminals to the Internet via satellite communication.

DESCRIPTION OF EXAMPLE EMBODIMENTS

Overview

Figure 1:
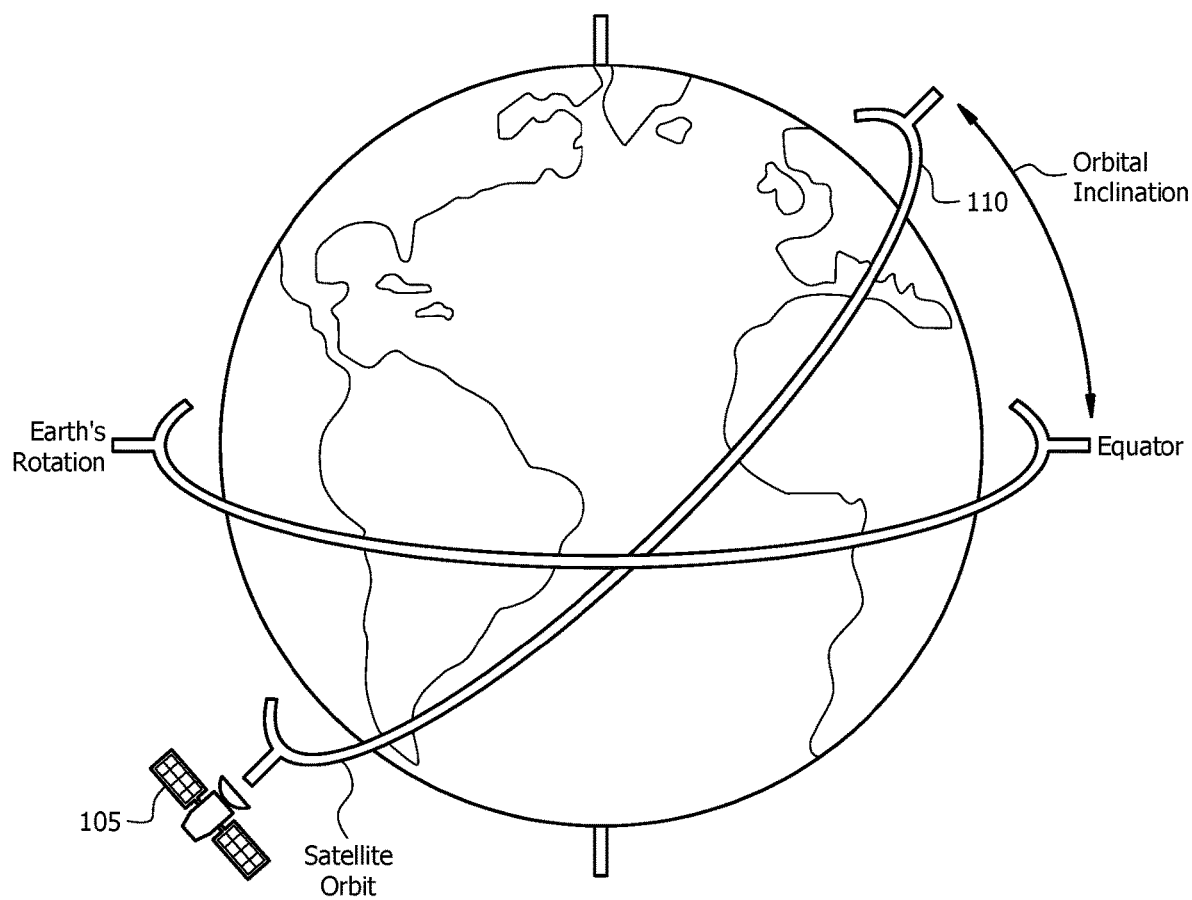
FIGS. 1-4 illustrate example deployments of a satellite network, in accordance with certain embodiments.

According to an embodiment, a node comprises one or more processors and one or more computer-readable non-transitory storage media comprising instructions that, when executed by the one or more processors, cause one or more components of the node to perform operations. The operations comprise determining a link quality associated with each satellite link of a plurality of satellite links and applying load balancing to the plurality of satellite links. The load balancing is based at least in part on the respective link quality associated with each satellite link. The load balancing comprises determining which of the satellite links to include in an active set selected to communicate data to or from the node and, for each satellite link in the active set, determining a portion of the data to communicate via the respective satellite link. The operations further comprise transmitting or receiving the data via the satellite links in the active set. Each satellite link in the active set communicates its respective portion of the data.

According to another embodiment, a method performed by a node comprises determining a link quality associated with each satellite link of a plurality of satellite links and applying load balancing to the plurality of satellite links. The load balancing is based at least in part on the respective link quality associated with each satellite link. The load balancing comprises determining which of the satellite links to include in an active set selected to communicate data to or from the node and, for each satellite link in the active set, determining a portion of the data to communicate via the respective satellite link. The method further comprise transmitting or receiving the data via the satellite links in the active set. Each satellite link in the active set communicates its respective portion of the data.

According to yet another embodiment, one or more computer-readable non-transitory storage media may embody instructions that, when executed by a processor of a node, cause the performance of operations. The operations comprise determining a link quality associated with each satellite link of a plurality of satellite links and applying load balancing to the plurality of satellite links. The load balancing is based at least in part on the respective link quality associated with each satellite link. The load balancing comprises determining which of the satellite links to include in an active set selected to communicate data to or from the node and, for each satellite link in the active set, determining a portion of the data to communicate via the respective satellite link. The operations further comprise transmitting or receiving the data via the satellite links in the active set. Each satellite link in the active set communicates its respective portion of the data.

Technical advantages of certain embodiments of this disclosure may include one or more of the following. Certain embodiments facilitate determining which of a plurality of available satellite links to use for communicating data between nodes. Certain embodiments facilitate determining a portion of the data to communicate via a particular satellite link. The selection of satellite links and the portion of the data to communicate via a particular satellite link is based at least in part on link quality. In this manner, data may be communicated via a satellite network in a manner that may optimize or improve Quality of Service (QoS) and/or Quality of Experience (QoE) performance. Certain embodiments allow for adapting the selection of satellite links and/or the portion of data to communicate via a particular link based on observed or predicted changes in link quality. As an example, a satellite moving out of view of a terrestrial node (e.g., due to movement of the satellite along its orbit or due to an obstruction, such as a weather event) can be removed from the communication path or used to carry a smaller portion of data, and a satellite moving in view of the terrestrial node can be added to the communication path or used to carry a larger portion of data. Certain embodiments facilitate load balancing among satellite links in order to meet end-to-end QoS and/or QoE targets between two terrestrial nodes that are connected via satellite communication. In certain embodiments, the selection of satellite links is based at least in part on one or more attributes of the satellites, such as current or predicted geometry of the satellites relative to each other, identification of the subshell that a satellite belongs to, etc. The attributes of the satellites may affect the number of inter-satellite hops between two terrestrial nodes and/or the link quality associated with the inter-satellite connections. Thus, selection of satellite links based at least in part on one or more attributes of the satellites may increase the likelihood of meeting or exceeding performance targets (e.g., QoS and/or QoE).

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Orbital regions around the earth include Low Earth Orbit (LEO), Medium Earth Orbit (MEO), and High Earth Orbit (HEO). The orbital regions may be described in various manners, for example, based on altitude or based on orbital period, with LEO nearest the earth, followed by MEO and then HEO. In general, most man-made satellites are considered to be in LEO. With the deployment of mega constellations of LEO satellites, multiple satellites are likely to be within connecting range and direct view of a terrestrial node at any given time. Thus, the terrestrial node can establish connections to any of multiple satellites, each of which will deliver a unique and dynamic link quality. As further described below, embodiments of the present disclosure may use the link quality when determining how to allocate a load to one or more links.

FIGS. 1-4 illustrate example deployments of a satellite network. In a typical deployment, a plurality of satellites 105 are launched into specific orbits 110 (also referred to as "orbital planes"). As shown in FIG. 1, an orbit 110 consists of a path taken by a satellite 105. A given orbit 110 may be circular or elliptical, for example, and an orbit 110 is often defined by its altitude, its inclination angle, and its crossing point with the equator.

Figure 2:
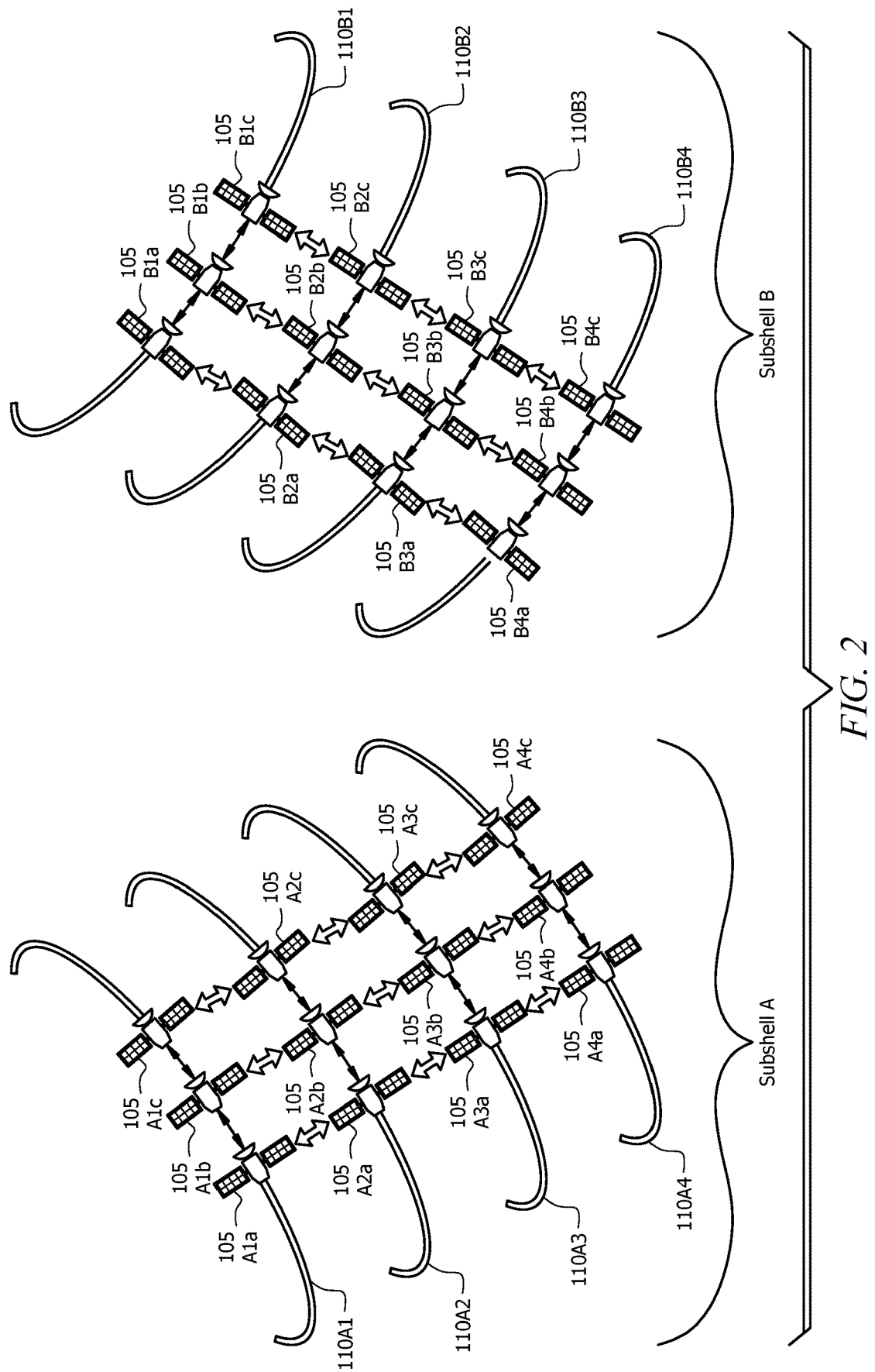

FIG. 2 illustrates a plurality of satellites 105 (e.g., 105A1a-105A4c and 105B1a-105B4c) arranged in a first subshell (subshell "A") and a second subshell (subshell "B"). In the example of FIG. 2, subshell A includes four orbits 110 (e.g., 110A1-110A4) and subshell B includes four orbits 110 (e.g., 110B1-110B4). FIG. 2 identifies each orbit 110 based on the orbit's subshell (A or B) and orbit number (1, 2, 3, or 4). For example, orbit 110A1 identifies the first orbit in subshell A, orbit 110A2 identifies the second orbit in subshell A, and so on. Similarly, FIG. 2 identifies each satellite 105 based on the satellite 105's subshell (A or B), orbit (1, 2, 3, or 4), and order with respect to other satellites 105 in the same orbit (a, b, or c). For example, satellite 105A1a identifies the satellite 105 in subshell A, orbit 1, and position "a" of the orbit.

Together, subshell A and subshell B form a shell. Subshell A comprises a plurality of satellites 105A1a-105A4c, and subshell B comprises a plurality of satellites 105B1a-105B4c. For purposes of the example, satellites 105A1a-105A4c of subshell A may be currently travelling their respective orbits 110A1-110A4 in a generally northeastern direction relative to the Earth, and satellites 105B1a-105B4c of subshell B may be currently travelling their respective orbits 110B1-B4 in a generally southeastern direction relative to the Earth. When a satellite in subshell A (such as satellite 105A1a) reaches the northernmost point in its orbit, the satellite may begin moving in a generally southeastern direction relative to the Earth in order to traverse the other side of the Earth. Similarly, when a satellite in subshell B (such as satellite 105B1a) reaches the southernmost point in its orbit, the satellite may begin moving in a generally northeastern direction relative to the Earth in order to traverse the other side of the Earth. From the perspective of the satellite 105, this "change in direction" relative to the Earth is simply the result of the satellite 105 continuing to progress along its circular/elliptical orbit 110.

In the example shown in FIG. 2, subshell A comprises four orbits, in particular, orbits 110A1, 110A2, 110A3, and 110A4. As shown in FIG. 2, orbits 110A1-110A4 are substantially parallel. Orbits 110A1 and 110A2 are adjacent to each other. Orbits 110A2 and 110A3 are adjacent to each other. Orbits 110A3 and 110A4 are adjacent to each other. Satellites 105A1a, 105A1b, and 105A1c travel orbit 110A1. Satellites 105A2a, 105A2b, and 105A2c travel orbit 110A2. Satellites 105A3a, 105A3b, and 105A3c travel orbit 110A3. Satellites 105A4a, 105A4b, and 105A4c travel orbit 110A4.

Similarly, in the example shown in FIG. 2, subshell B comprises four orbits, in particular, orbits 110B1, 110B2, 110B3, and 110B4. As shown in FIG. 2, orbits 110B1-110B4 are substantially parallel. Orbits 110B1 and 110B2 are adjacent to each other. Orbits 110B2 and 110B3 are adjacent to each other. Orbits 110B3 and 110B4 are adjacent to each other. Satellites 105B1a, 105B1b, and 105B1c travel orbit 110B1. Satellites 105B2a, 105B2b, and 105B2c travel orbit 110B2. Satellites 105B3a, 105B3b, and 105B3c travel orbit 110B3. Satellites 105B4a, 105B4b, and 105B4c travel orbit 110B4.

Each satellite 105 follows the satellite 105 ahead of it in the same orbit 110. Satellites 105 in the same orbit 110 move at the same speed and in the same direction, for example, in order to maintain their specified altitude. The relative distance between satellites 105 in the same orbit 110 is fixed. As a result, satellites 105 in the same orbit 110 follow one another in a pre-determined and predictable fashion. Taking orbit 110A1 as an example, the relative distance between satellite 105A1a and satellite 105A1b is fixed, and the relative distance between satellite 105A1b and 105A1c is also fixed.

Figure 3:
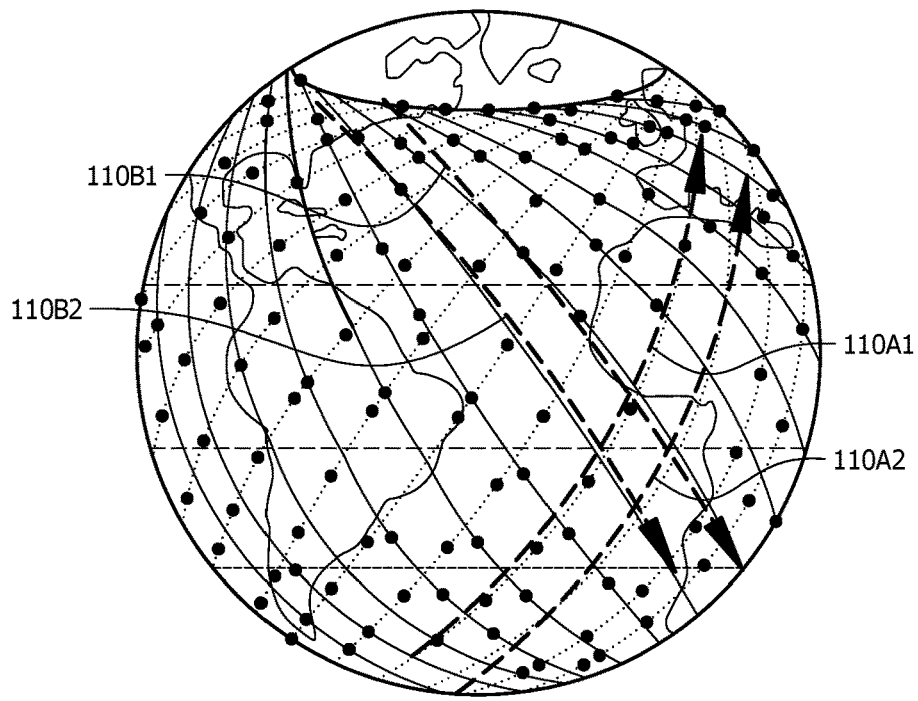

As described above, subshells A and B form a shell around the Earth. For ease of illustration, FIG. 2 shows subshells A and B as two distinct groups. However, in a real-world deployment, orbits 110A1-110A4 may intersect orbits 110B1-110B4 to form a mesh around the Earth, as shown in FIG. 3. In particular, FIG. 3 illustrates an example of the shell comprising subshells A and B relative to the Earth. For example, FIG. 3 includes orbits 110A1 and 110A2 of subshell A and orbits 110B1 and 110B2 of subshell B. A shell is often defined as a set of satellites that orbit the Earth at a relatively similar altitude. As one example, a shell may comprise a collection of 53-degree orbital planes that are offset from one another based on where they cross the equatorial line. In general, a satellite shell can be decomposed into two subshells from the perspective of a terrestrial observer. To see this, notice that during each full rotation, a typical satellite 105 will spend half of its time moving northward (NE or NW) followed by another half moving southward (SE or SW). Now consider the entire set of "parallel" orbital planes shown in FIG. 3. A typical orbit 110 is packed with equally-distanced satellites 105; half of which are on ascent while the other half are on descent. A terrestrial observer looking at the sky overhead will see both groups simultaneously. In other words, such an observer will see two distinct groups of satellites 105, a first group involving ascending satellites 105 moving northward and the second group involving descending satellites 105 moving southward.

Returning to FIG. 2, each satellite 105 comprises one or more interfaces (such as one or more optical transceivers) that allow the satellite 105 to connect to and communicate with other satellites 105. For instance, in the example of FIG. 2, satellite 105A2b in orbit 110A2 has established four connections to its neighboring satellites 105. Two of the connections connect satellite 105A2b to neighboring satellites 105 that are in its same orbit 110A2 (i.e., satellites 105A2a and 105A2c). Thus, the direction of these connections remains fixed. The other two connections connect satellite 105A2b to satellites 105 in neighboring orbits (i.e., satellite 105A1b in orbit 110A1 and satellite 105A3b in orbit 110A3). As a result, the system keeps track of the position of those neighbors and adjusts the direction of the transceiver to maintain the connection. FIG. 2 illustrates other examples of connections among other satellites 105 (denoted by arrows shown between the satellites 105). The pattern of connections shown in FIG. 2 are for the purposes of example and illustration only. The choice of which neighbors to connect to is important and may be optimized. In other embodiments, alternative or additional connections may be made to a satellite 105 that is not in the same orbit 110, a satellite 105 that is not even in an adjacent orbit 110, or a satellite 105 that is not even in the same subshell.

Figure 4:
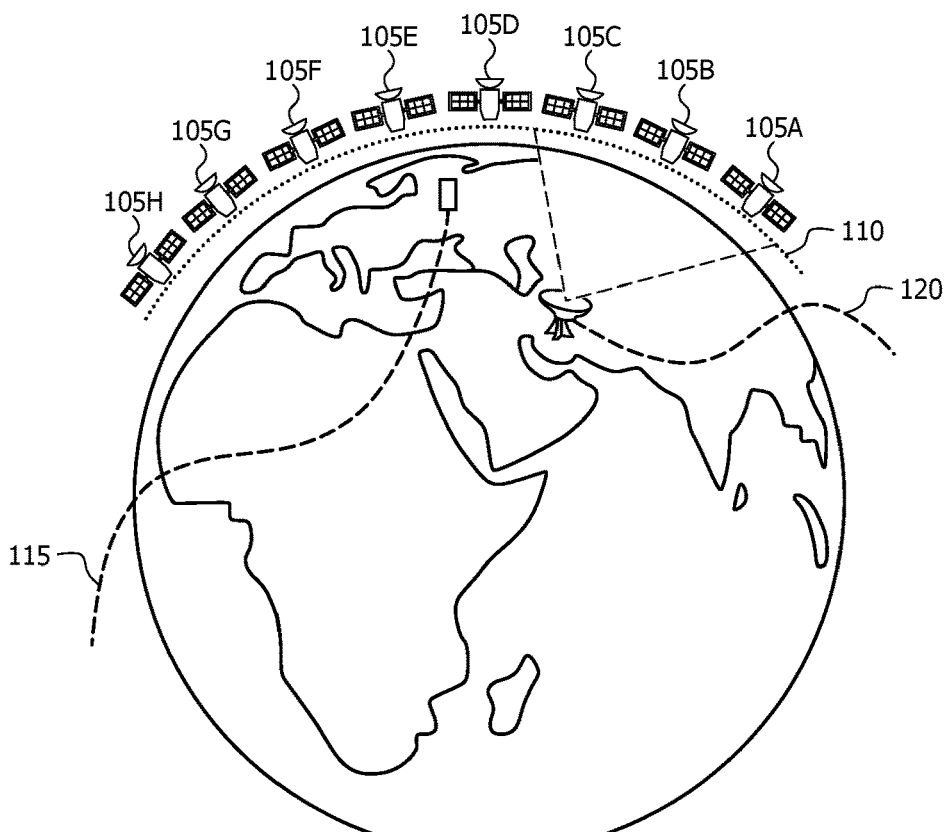

FIG. 4 illustrates an example of a network comprising a user terminal 115 that communicates with a ground station 120 via one or more of a plurality of satellites 105 (e.g., 105A-105H). In certain embodiments, a user terminal may comprise a reasonably low-cost device that allows residential or commercial users to connect their network to a satellite. A typical user terminal is often resource constrained in terms of bandwidth, power, computing resources (e.g., processing availability, memory), etc. Examples of a user terminal 115 may include a satellite dish (such as a residential satellite dish) or a wireless device equipped for satellite communication.

A ground station 120 is typically a fairly expensive installation strategically located to act as a gateway to the terrestrial Internet. Ground station 120 is typically equipped with enormous computation and networking capabilities. Thus, resources of ground station 120 may be used to facilitate providing services to resource-constrained user terminals 115.

Satellites 105 provide a path for connecting communication between user terminal 115 and ground station 120. A satellite constellation will have may satellites 105 (such as tens of thousands of satellites 105). In some cases, satellites 105 are power constrained and cannot be readily upgraded after their launch.

FIG. 4 depicts how the satellites 105 look from the perspective of a terrestrial node, such as user terminal 115 or ground station 120. The terrestrial node will have a "field of view" that corresponds with a portion of the sky that is within its line of sight. The size of this cone depends on many factors, including the geographical location of the terrestrial node, its altitude, the surrounding vegetation and visual obstacles, as well as the antenna type (number of elements, etc.).

The example shown in FIG. 4 shows the field of view or cone associated with ground station 120. Consider a specific orbit 110 that crosses this cone (the orbit 110 comprising satellites 105A-105H). The first satellite 105A that enters this cone will emerge/rise from one side, traverse a "chord" within the field of view, and start to disappear at the other side. When enough satellites 105 are launched into a given orbit 110, multiple satellites 105 will follow into the field of view of ground station 120 such that before one has disappeared at the wayside, one or more other satellites 105 have entered the field of view. The example illustrated in FIG. 4 shows satellites 105A, 105B, and 105C currently within ground station 120's field of view. Note that, in general, there can be multiple distinct orbits 110 traveling through any given cone. As an example, another orbit adjacent to orbit 110 may be within ground station 120's field of view. As another example, another orbit associated with another subshell may be within ground station 120's field of view.

User terminal 115 will have its own field of view, similar to that described for ground station 120. As an example, suppose that satellite 105D is currently within user terminal 115's field of view. In an embodiment, user terminal 115 may communicate data to satellite 105D, satellite 105D may communicate the data to satellite 105C, and satellite 105C may communicate the data to ground station 120. Similarly, ground station may communicate data to satellite 105C, satellite 105C may communicate the data to satellite 105D, and satellite 105D may communicate the data to user terminal 115. The satellites 105 used for communication may be updated in response to changes in link quality (e.g., as the various satellites 105 move in and out of the field of view of user terminal 115 and/or the field of view of ground station 120).

Although the preceding example describes communication between a user terminal 115 and a ground station 120 via satellites 105, other embodiments may facilitate communication between any suitable terrestrial nodes via satellites 105. As an example, in certain embodiments, it is possible for multiple user terminals 115 to communicate with each other via satellites 105. As another example, in certain embodiments, it is possible for multiple ground stations 120 to communicate with each other via satellites 105.

Traditionally, a terrestrial node (e.g., user terminal 115 or ground station 120) would use a pre-determined criteria to identify the satellites 105 that can provide the best service. The terrestrial node would then try to maintain this connection for the entire period that the satellite 105 is within its line of sight. However, the quality of this link is not static. As the satellite 105 traverses its orbit 110, the terrestrial node will experience a wide range of service qualities. For example, during a portion of a satellite 105's motion, its beam may have to penetrate through a heavy cloud. At other times, satellite 105 may experience the effects of air turbulence. The problem is that the terrestrial node is forced to use a link with low Quality of Service (QoS) when the terrestrial node would benefit from connecting to other satellites 105 that exhibit improved link qualities.

Certain embodiments of the present disclosure provide solutions wherein the choice of which satellite(s) 105 to connect to at any given time are based at least in part on real-time observations and/or predictions associated with the quality of the available satellite links. In this manner, the terrestrial node need not be stuck with a satellite connection that has become inferior to other currently available choices. For example, in certain embodiments, the terrestrial node connects to multiple satellites 105 simultaneously and adaptively load balances across the available links.

Certain embodiments of the present disclosure address shortcomings of existing satellite communications. These shortcomings of existing satellite communications are exasperated by the lack of multiple active links between a terrestrial node and overhead satellites 105. To address this problem, certain embodiments continually measure and monitor the link quality between the terrestrial node and multiple satellites 105. Examples of measurements for determining link quality may include Signal to Noise Ratio (SNR), Received Signal Strength Indicator (RSSI), Bit Error Rate (BER), delay, weather-related measurements (such as temperature or atmospheric moisture content), and/or other measurements. Link quality may be calculated based on a heuristic algorithm, a deterministic algorithm, or a statistical model. The link quality calculation may indicate current conditions and/or the link quality calculation may predict the link quality and how long the link quality will be good.

Certain embodiments use a weighted load balancing scheme across all available links. Load balancing based on link quality may be well-suited to satellite communication, such as satellite communication with LEO satellites, because the time scale at which various natural phenomenon affect the link quality is long enough to justify the efforts associated with monitoring the links and switching/load balancing across them. However, the same principles could also apply to cellular or other wireless systems.

Continuing the discussion of FIG. 4, the figure illustrates a typical situation where a terrestrial node has multiple satellites 105 (possibly from multiple orbits 110) within its field of view. Given the relative speed of a satellite 105 in LEO, for example, each satellite 105 will be accessible to the terrestrial node for minutes during which the satellite 105 traverses a large swath of the sky. As a satellite 105 traverses the overhead sky, the link between the satellite 105 and the terrestrial node will be affected by many natural phenomenon, for example, a patch of cloud.

Certain embodiments of the present disclosure monitor the link quality between the terrestrial node and all satellites 105 that are within its field of view to determine which satellite 105 will provide the highest quality of service and for how long. The measurements may include a wide range of possibilities, such as SNR, RSSI, BER, delay, weather-related measurements (such as temperature or atmospheric moisture content), and/or other measurements. Additionally, in certain embodiments, the terrestrial node identifies which subshell each observable satellite 105 belongs to and uses this information in deciding which satellite 105/link to connect to.

For example, as described with respect to FIGS. 2-3, satellites 105 may be grouped into subshells, such as first subshell moving northward (NE or NW) from the perspective of a terrestrial node at a given location and a second subshell moving southward (SE or SW) from the perspective of the terrestrial node. The selection of subshell can impact performance. As an example, one subshell may provide more optimal routing than the other depending on the locations of each terrestrial node and the satellites 105 or the geometry between nodes. Even if QoS, delay, jitter, and/or other parameters are the same for the links associated with each subshell, the selection of subshell can affect the number of hops from the source to the destination. Thus, selection of subshell can be made to minimize the number of hops or otherwise optimize end-to-end QoS. Also, connectivity between satellites 105/hops is typically better when the satellites 105 are located in the same subshell. Suppose the available links include a first link (best link quality) associated with a satellite 105 in a first subshell, a second link (second best link quality) associated with a satellite 105 in a second subshell, and a third link (third best link quality) associated with a satellite 105 in the first subshell. Certain embodiments may select the first and third links based on the first and third links belonging to the same subshell.

As described above, certain embodiments determine which satellite 105 will provide the highest quality of service and for how long. The terrestrial node may use a variety of statistical tools to determine and predict the quality of service on each link and its corresponding coherence time over which the predictions are valid. With these measurements, the terrestrial node will deploy a weighted load balancer across all available links so as to maximize a user's quality of experience (QoE). For example, a link with higher RSSI, higher SNR, and low BER will receive a higher weight in the load balancing. For particular applications or based on certain limitations at the user terminal, load balancing may reduce to selecting a single link for a period of time, before transitioning to a new link. Under such circumstances, the load balancing resembles a Time Division Multiplexing (TDM) system.

Certain embodiments apply the load balancing technique to a soft handoff. For instance, when the RSSI drops below a certain threshold, the corresponding link can be removed from the bundle of available active links, and if a link's RSSI reaches an acceptable threshold it will be added to the bundle. Thus, at any given time, the number of active links can vary but the terrestrial node will have a connection to the satellite network. In addition, advancements in phased arrays and new beam forming techniques can enable a terrestrial node to point to multiple satellites with the same hardware currently used for single satellite tracking.

Certain embodiments provide multi-link weighted load balancing for satellite networks. For example, a terrestrial node (e.g., user terminal 115 or ground station 120) can have multiple active links to satellites 105 within range. Certain embodiments bundle the links to deliver higher bandwidth. For example, suppose the bundle includes 4 links. The solution may send 5 Mbps traffic on the first link, 10 Mbps traffic on the second link, 10 Mbps traffic on the third link, and 2 Mbps traffic on the fourth link, depending on the quality of each link under current and/or predicted conditions. Load balancing may be performed at any suitable layer, such as layer 2 (e.g., data link layer of the Open Systems Interconnection (OSI) model), layer 3 (e.g., network layer of the OSI model), and/or other layer(s). In an embodiment, load balancing may be performed across multiple layer 2 links. The layer 2 load balancing may be transparent to layer 3 (from the perspective of layer 3, the bundle of layer 2 links may appear as a single link).

The usage of each link is weighted based on a weighting factor. The weighting factor may be based on multiple parameters, such as one or more of SNR, RSSI, BER, delay, weather-related measurements (such as temperature or atmospheric moisture content), predicted the QoS, coherence time associated with predicted QoS, etc. Certain embodiments use different weighting coefficients for different parameters. As an example, the weighting factor may be based on a linear function $\alpha(SNR)+\beta(RSSI)+\gamma(BER)$, etc., where the values of coefficients $\alpha$, $\beta$, and $\gamma$ can be different. Certain embodiments provide flexibility to fine-tune the coefficients. Certain embodiments may determine weighting coefficients based on the application. For example, BER may be given higher weight for certain types of applications, and SNR may be given higher weight for other types of applications. The weighting assigned to a particular link can change over time based on changing conditions/changes in link quality. For example, certain embodiments continually measure and update the link quality as satellites 105 move in and out of view.

Load balancing based on link quality may be well-suited to satellite links and/or other types of links impacted by variability of link quality. This is different than load-balancing in a terrestrial context, such as in the context of Ethernet (e.g., Link Aggregation Group (LAG) protocol), where each link has a fixed bandwidth and load-balancing is simply a function of available bandwidth (without weighting bandwidth allocation based on link quality as described in embodiments of this disclosure).

Certain embodiments determine membership of a link to a bundle of active links dynamically. For example, if one link degrades beyond a threshold, the link can be removed from the bundle of active links and load balancing over the link stops. Other links can be added as they come into range (e.g., once the link quality exceeds a threshold). Thus, as a satellite 105 moves in and out of range, is impacted by cloud cover, etc., the load balancing can add or remove the link from the bundle and/or adjust the amount of data sent over the link. The total number of links in the bundle may be determined dynamically. For example, at certain times, the bundle may include 1 link, 2 links, 3 links, or more links depending on current and/or predicted link quality.

Although certain examples have described selection and load balancing of links between a terrestrial node and one or more satellites 105, the link selection and load balancing techniques may be used for any links of a path. For example, the link selection and load balancing techniques may be used for links between a first terrestrial node (e.g., source node) and one or more ingress satellites 105, links between a satellite 105 and one or more neighboring satellites 105 (e.g., links associated with one or more hops from satellite-to-satellite), and/or links between one or more egress satellites 105 and a second terrestrial node (e.g., destination node).

Link quality between two communicating nodes (such as a terrestrial node and a satellite 105) is not necessarily symmetric. For example, the uplink from a terrestrial node to a satellite 105 may have very different characteristics than the downlink from the satellite 105 to the terrestrial node. The measurements required to determine the link quality often require the measuring to be performed by the receiver (e.g., the satellite 105 measures signals received from the terrestrial node on the uplink, and the terrestrial node measures signals received from the satellite 105 on the downlink). Thus, in certain embodiments, the node performing link selection and load balancing may measure certain measurements itself and/or may receive a report indicating measurements performed by another node. As an example, a terrestrial node performing link selection and load balancing may measure link quality on the downlink and may receive a report from satellite 105 indicating link quality on the uplink. In addition, or in the alternative, the report may indicate measurements associated with other links in the path (such as links associated with hops between neighboring satellites 105 or links between the satellites 105 and another terrestrial node at the other side of the communication path). This information may be used to facilitate link selection and load balancing of links in an end-to-end path.

Certain embodiments monitor the link quality between each terrestrial node and all satellites 105 that are within the field of view of each terrestrial node. As an example, this may include uplink and downlink quality between a first terrestrial node (e.g., user terminal 115) and its observable satellites 105 as well as uplink and downlink quality between a second terrestrial node (e.g., ground station 120) and its observable satellites 105. As described above, link quality can be monitored based on measurements of SNR, RSSI, BER, delay, weather-related quantities (e.g., temperature or atmospheric moisture content), and/or other suitable measurements. A variety of statistical tools may be used to determine and predict the QoS on each link and its corresponding coherence time (the time over which these predictions are valid).

The measurements used for monitoring link quality may be obtained by performing the measurement by the node (such as user terminal 115) and/or by receiving a report indicating the results of measurements performed by another node (such as satellite 105). As an example, a user terminal 115 may determine/measure various components of the link quality corresponding to the downlink, and a satellite 105 may determine/measure various components of link quality corresponding to the uplink. The satellite 105 informs the user terminal 115 of its measurements. In certain embodiments, the satellite 105 communicates this information during the initial handshake as well as periodically afterwards, for example, by sending updated link quality measurements via in-band signaling or by simply piggy-backing them on some packets. This will enable the user terminal 115 to know the link quality on both the uplink and the downlink.

A similar method may be used to determine the link quality on both the uplink and the downlink between a ground station 120 and a satellite 105. As an example, the ground station 120 may determine/measure various components of the link quality corresponding to the downlink. The satellite 105 may determine/measure various components of link quality corresponding to the uplink. The satellite 105 informs the ground station 120 of its measurements, for example, during an initial handshake as well as periodically afterwards.

In certain embodiments, anode communicates measurements associated with upstream or downstream links to another node. As an example, each user terminal 115 may periodically report its uplink/downlink link qualities to its nearest ground station 120. The report may be sent from user terminal 115 to ground station 120 via one or more satellites 105. Given the vast computational resources at the ground station 120 as well as the powerful terrestrial networks that connect the ground station 120 to other ground stations 120, the ground stations 120 can exchange these link quality measurements with each other. As a result, the ground stations 120 will be able to create and maintain a global view of all link quality measurements.

Note that mature satellite communication systems of the future will extensively leverage inter-satellite communication links. Once such large-scale deployments are available, the data path between a user terminal 115 and its terrestrial destination will include one or more inter-satellite links as well as the aforementioned uplinks and downlinks to and from the satellites 105. The choice of inter-satellite links, and the related routing decisions, can have significant impact on the end-to-end QoE. As a result, certain embodiments of the weighted load balancing consider the following: link quality for uplink, routing and inter-satellite links, and link quality for downlink.

Communicating with satellites 105 on different subshells may result in widely different experiences, even if the both satellites 105 possess identical link qualities. As a result, when selecting a satellite link (as well as the weight given to it), certain embodiments also consider which subshell that satellite 105 belongs to. For similar reasons, when selecting a satellite link (as well as the weight given to it), certain embodiments take into account the number of inter-satellite connections available to the respective satellite 105 as well as the positions of that satellite 105's neighbors. In other words, certain embodiments account for the local geometry of the satellite constellation when selecting a satellite link.

Suppose a user terminal 115 wishes to communicate with a terrestrial resource/destination. The user terminal 115 will connect to any of the observable satellites 105 within its field of view, and the satellite 105 will forward a request from the user terminal 115 to the closest ground station 120. Recall that, in certain embodiments, the ground station 120 has a global view of all recently reported link qualities, as well as routing states, inter-satellite connections, etc. For example, a network may comprise a plurality of ground stations 120. The ground stations 120 may be communicatively coupled, for example, via terrestrial networks. Each ground station 120 may receive reported link qualities, routing states, inter-satellite connections, and/or other information (e.g., from satellites 105 in the ground station 120's field of view) and may share this information with the other ground stations 120. The information that a ground station 120 receives from a satellite 105 may be determined by the satellite 105 itself or forwarded by the satellite 105 on behalf of a user terminal 115 or another satellite 105. The ground station 120 that received the user terminal 115's request will respond with a digest of the relevant information. The user terminal 115 will use this information as well other local measurements to compute and deploy a weighted load balancer across all available links so as to maximize its user's QoE.

Certain embodiments give ground stations 120 autonomy in deciding what information to share with the user terminal 115. This autonomy and discretion will allow the ground station 120 to consider technical matters such as coherence time of a measurement (the duration over which that measurement will be accurate) or which subset of links are candidates for communication with the user terminal 115 (e.g., based on the location of the user terminal 115 and satellites 105) as well as non-technical issues, such as legal considerations surrounding privacy in deciding what information to share with user terminals 115. As a result, locally available link quality measurements should be sufficient for a user terminal 115 to compute and deploy a weighted load balancer (even if a more optimal solution could be identified if the user terminal 115 were to be provided with additional information).

The weighted load balancer may perform load balancing based on any of the techniques described herein. As an example, in one embodiment, a link with higher RSSI, higher SNR, and low BER will receive a higher weight in the load balancing. For particular applications or based on certain limitations at the user terminal, load balancing may reduce to selecting a single link for a period of time, before transitioning to a new link. Certain embodiments use load balancing in a soft handoff. For instance, when the RSSI drops below a certain threshold, the corresponding link can be removed from the bundle of available active links, and if a link's RSSI reaches an acceptable threshold it will be added to the bundle. Thus, at any given time the number of active links can vary, but the user terminal 115 will have a connection to the satellite network.

In summary, certain embodiments apply active multi-link weighted load balancing for satellite networks to take advantage of the aforementioned advancements in phased arrays.

Figure 5:
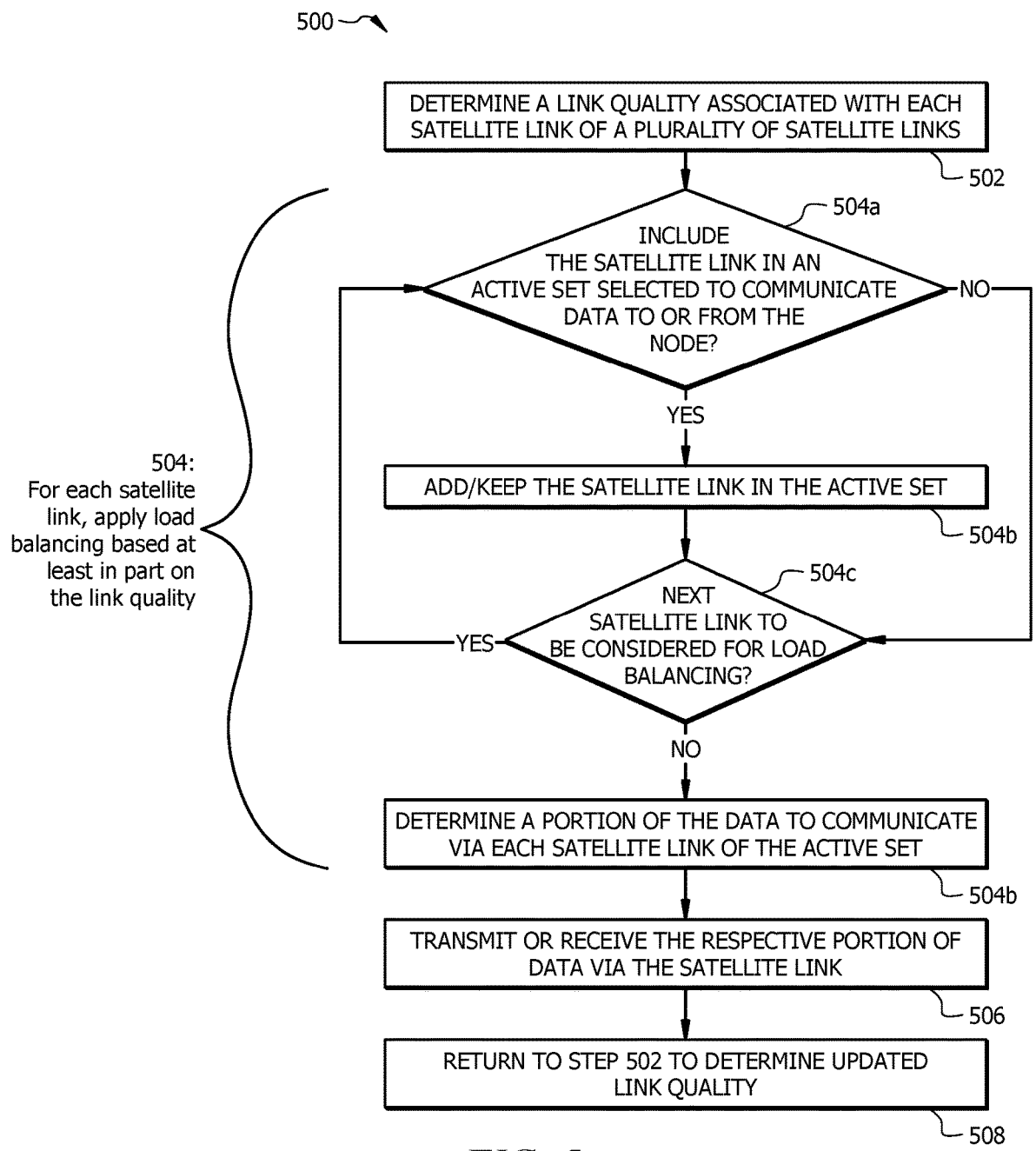
FIG. 5 illustrates an example flow chart of a method that may be performed in a satellite network, in accordance with certain embodiments.

FIG. 5 illustrates an example flow chart of a method 500 that may be performed in a satellite network, in accordance with certain embodiments. Depending on the embodiment, method 500 may be performed by any suitable node in the network, such as a terrestrial node (e.g., user terminal 115 or ground station 120) or satellite 105 described with respect to FIGS. 1-4. In certain embodiments, anode may comprise one or more processors (such as processor 602 described below with respect to FIG. 6) and one or more computer-readable non-transitory storage media (such as memory 604 and/or storage 606 described below with respect to FIG. 6). The one or more computer-readable non-transitory storage media comprise instructions that, when executed by the one or more processors, cause one or more components of the node to perform method 500.

In certain embodiments, method 500 begins at step 502 with determining a link quality associated with each satellite link of a plurality of satellite links. The plurality of satellite links may comprise one or more satellite links currently in an active set, one or more satellite links not currently in an active set, or both. In an embodiment, the plurality of satellite links may comprise satellite links between a first terrestrial node (e.g., user terminal 115) and one or more satellites 105 in the field of view of the first terrestrial node. These satellite links may be available to bundle in a soft handoff between the first terrestrial node and one or more of the satellites 105 in its field of view. In certain embodiments, the plurality of satellite links may further comprise one or more satellite links available for use in an end-to-end path between the first terrestrial node and the second terrestrial node (e.g., ground station 120), such as one or more inter-satellite links and/or one or more satellite links between the second terrestrial node and the satellite(s) 105 in its field of view.

Examples of options for determining the link quality are described above with respect to FIGS. 1-4. For example, in certain embodiments, method 500 may determine the link quality at least in part based on performing measurements of SNR, RSSI, BER, delay, weather-related measurements (such as temperature or atmospheric moisture content), and/or other measurements. Link quality may be calculated based on a heuristic algorithm, a deterministic algorithm, or a statistical model. The link quality calculation may indicate current conditions and/or the link quality calculation may predict the link quality and how long the link quality will be good.

In certain embodiments, method 500 may determine the link quality associated with a particular satellite link (such as a first satellite link of the plurality of satellite links) based at least in part on a report received from another node. As an example, the node performing method 500 may be a first terrestrial node (e.g., user terminal 115), and the first satellite link may be available to connect the first terrestrial node and a first satellite 105 (e.g., a satellite 105 in the field of view of the first terrestrial node). The first terrestrial node may determine a downlink quality associated with the first satellite link based on measuring a signal received from the first satellite 105. The first terrestrial node may determine an uplink quality associated with the first satellite link based on receiving a report indicating a measurement that the first satellite 105 performs on a signal transmitted by the first terrestrial node. In an embodiment, the first terrestrial node receives the report from the first satellite 105 itself. In another embodiment, the first terrestrial node receives the report from a second terrestrial node (e.g., ground station 120), which may deliver the report to the first terrestrial node via satellite communication (e.g., via the first satellite 105 and/or other satellites 105).

The second terrestrial node may be configured to collect link quality information and generate the report to send to the first terrestrial node in order to indicate relevant link quality information. The report from the second terrestrial node may include uplink quality associated with the first satellite link (e.g., based the first satellite 105 measuring the uplink and providing the result to the second terrestrial node). In certain embodiments, the report from the second terrestrial node and the first terrestrial node may include link quality information associated with other satellite links between the first and second terrestrial nodes, such as link quality information associated with inter-satellite links and/or link quality information associated with satellite links between the second terrestrial node and satellite(s) 105 in its field of view. In this manner, the report may provide the first terrestrial node with an end-to-end view of link quality. Certain embodiments may collect information (e.g., link qualities, as well as routing states, inter-satellite connections, etc.) and generate the report at the ground station 120 to make use of the robust computing resources of the ground station 120 and/or to enforce privacy policies associated with the information collected.

In certain embodiments, the first terrestrial node is further configured to send a report indicating at least the downlink quality associated with the first satellite link (e.g., the downlink quality measured by the first terrestrial node) to the second terrestrial node. The second terrestrial node include this information in its collection of link quality information and may share the information with other terrestrial nodes (e.g., other ground stations 120). Thus, a ground station 120 may obtain a global view of all recently reported link qualities, as well as routing states, inter-satellite connections, etc. based on information received from user terminals 115, other ground stations 120, and/or satellites 105.

Method 500 may proceed with applying load balancing to the plurality of satellite links, as indicated by step 504. The load balancing is based at least in part on the respective link quality associated with each satellite link. The load balancing comprises determining which of the satellite links to include in an active set of satellite links selected to communicate data to or from the node and, for each satellite link in the active set, determining a portion of the data to communicate via the respective satellite link. Load balancing may be performed at any suitable layer, such as layer 2 or layer 3. In certain embodiments, step 504 comprises sub-steps 504a-d.

In sub-step 504a, method 500 proceeds determines whether to include a particular satellite link in the active set. The active set comprises satellite links selected to communicate data to or from the node. As an example, the particular satellite link considered in sub-step 504a may be referred to as a first satellite link. Certain embodiments determine to include the first satellite link to the active set when the link quality associated with the first satellite link satisfies a first threshold. For example, the first satellite link may be added to or kept in the active set (depending on whether the first satellite link was previously included in the active set). Certain embodiments determine not to include the first satellite link in the active set when the link quality fails to satisfy a second threshold. For example, the first satellite may be removed from or prevented from being added to the active set (depending on whether the first satellite link was previously included in the active set).

In an embodiment, when an RSSI associated with the first satellite link reaches an acceptable threshold (first threshold), the first satellite link can be added to the active set. When the RSSI associated with the first satellite link drops below a certain threshold (second threshold), the first satellite link can be removed from the active set. The first threshold and the second threshold may be the same threshold or different thresholds. As an example of using different thresholds, the first threshold may be configured to require the first satellite link the have high link quality in order to be added to the active set. Once the first satellite link has been added to the active set, the second threshold may be configured to maintain the first satellite link in the active set as long as the first satellite link maintains high link quality or medium link quality, and to remove the first satellite link from the active set once it drops to low link quality. The first and second thresholds may be pre-determined or determined dynamically, depending on the embodiment. Certain embodiments determine the first and second thresholds dynamically, for example, based on link quality of neighboring satellite links, relative to link quality of neighboring satellite links, and/or based on other factors. Certain embodiments select the first and second thresholds in order to include the best satellite link(s) in the active set. Certain embodiments select satellite link(s) with the best link quality from a subset of satellite links that satisfy one or more other criteria (e.g., based on the subshell associated with the satellite link, based on a number of inter-satellite hops associated with the satellite link, and/or other suitable criteria).

If at sub-step 504a method 500 determines not to include the satellite link in the active set (the "no" branch of sub-step 504a), the method may skip to sub-step 504c (discussed below). If at sub-step 504a method 500 determines to include the satellite link in the active set (the "yes" branch of sub-step 504a), the method proceeds to sub-step 504b. At sub-step 504b, method 500 adds the satellite link to the active set (e.g., if the satellite link is not already part of the active set) or keeps the satellite link in the active set (e.g., if the satellite link is already part of the active set. The method proceeds to sub-step 504c.

In sub-step 504c, method 500 determines whether there is a next satellite link to be considered for load balancing. If method 500 determines in sub-step 504c that there is a next satellite link to be considered for load balancing (e.g., if any of the satellite links in the plurality of satellite links has not yet been considered), method 500 may return to sub-step 504a to determine whether to include the next satellite link in the active set. This is shown in the "yes" branch from sub-step 504c. If method 500 determines in sub-step 504c that there is not any next satellite link to be considered for load balancing (e.g., if the load balancing has already considered each satellite link in the plurality of satellite links), method 500 may proceed to sub-step 504d. This is shown in the "no" branch from sub-step 504c.

In sub-step 504d, method 500 determine a portion of the data to communicate via each satellite link of the active set. In general, method 500 may determine to communicate a larger portion of the data via a satellite link associated with higher link quality and to communicate a smaller portion of the data via a satellite link associated with lower link quality.

In certain embodiments, the active set comprises a first satellite link of the plurality of satellite links. Determining the portion of the data to communicate via the first satellite link in sub-step 504d may comprise determining a weighting factor associated with the first satellite link and applying the weighting factor to determine the portion of the data to communicate via the first satellite link. In certain embodiments, the weighting factor is determined based on a plurality of link quality parameters associated with the first satellite link. As an example, at least one of the link quality parameters indicates one of the following values associated with the first satellite link: SNR, RSSI, BER, delay, a weather-related value, predicted QoS, or coherence time associated with predicted QoS. Certain embodiments weight each link quality parameter according to a respective weighting coefficient. As an example, the weighting factor may be based on a linear function $\alpha(SNR)+\beta(RSSI)+\gamma(BER)$, etc., where the values of coefficients $\alpha$, $\beta$, and $\gamma$ can be different. In certain embodiments, each weighting coefficient depends on a type of application associated with the data communicated via the first satellite link. For example, certain real-time applications, such as Voice over Internet Protocol (VoIP) applications, may be relatively sensitive to BER. Thus, the $\gamma$ coefficient may have a relatively high weighting for VoIP applications. Other applications, such as file transfer applications, may be less sensitive to BER, so the $\gamma$ coefficient may have a relatively lower weighting for file transfer applications.

Method 500 proceeds to step 506 with transmitting or receiving the data via the satellite links in the active set. Each satellite link in the active set communicates its respective portion of the data determined in sub-step 504d. In certain embodiments, method 500 may then end, for example, if there is no further data to transmit or receive. Or, in certain embodiments, the method may return to step 502 to determine updated link quality information and repeat load balancing based on the updated link quality information (as indicated by step 508). For example, the updated link quality information may indicate new satellite links that have come into the field of view, old satellite links that have moved out of the field of view, or improvements or degradation to link quality associated with previously load-balanced satellite links (e.g., based on movement of the satellite, weather conditions, and/or other factors).

Method 500 may be implemented in various deployments or contexts. As an example, in an embodiment, the node performing method 500 corresponds to a first terrestrial node, and the active set of satellite links facilitates communication between the first terrestrial node and a second terrestrial node via a path may comprise a plurality of satellites 105. Determining which of the satellite links to include in the active set in step 504 (e.g., sub-step 504a) is based at least in part on an end-to-end link quality associated with the communication between the first terrestrial node and the second terrestrial node. In certain embodiments, at least one satellite link in the active set comprises an uplink from the first terrestrial node or the second terrestrial node to an ingress satellite 105 of the plurality of satellites 105, at least one satellite link in the active set comprises an inter-satellite link (a link between satellites 105), and at least one satellite link in the active set comprises a downlink from an egress satellite 105 of the plurality of satellites 105 to the other of the first terrestrial node or the second terrestrial node. Thus, the end-to-end link quality may be based on the uplink, the inter-satellite link(s), and the downlink.

Certain embodiments take both the forward path and the reverse path into consideration when determining satellite links to include in the active set. As an example, the forward path may be used to communicate a request from the first terrestrial node (e.g., user terminal 115) via an uplink to the satellite system that in turn communicates the request to the second terrestrial node (e.g., ground station 120) via a downlink. The reverse path may be used to communicate a response from the second terrestrial node via an uplink to the satellite system that in turn communicates the response to the first terrestrial node via a downlink.

Depending on the embodiment, the load balancing may consider link quality associated with any one or more of the following: uplink from the first terrestrial node to the satellite system, forward path from one satellite 105 to the next satellite 105, downlink from the satellite system to the second terrestrial node, uplink from the second terrestrial node to the satellite system, reverse path from one satellite 105 to the next satellite 105, and/or downlink from the satellite system to the first terrestrial node.

In certain embodiments, the node performing method 500 corresponds to a first terrestrial node (e.g., user terminal 115), and the active set of satellite links facilitates communication between the first terrestrial node and a second terrestrial node (e.g., ground station 120) via a path comprising a plurality of satellites 105. In certain embodiments, the active set determined in step 504 (e.g., sub-step 504a) comprises one or more inter-satellite links. The one or more inter-satellite links are selected based in part on a number of inter-satellite hops in the path. The number of inter-satellite hops depends on a geometry of the satellites 105 relative to each other.

In certain embodiments, the plurality of satellite links comprises a first satellite link. Determining whether to include the first satellite link in the active set in step 504 (e.g., sub-step 504a) is based in part on whether the first satellite link is associated with a first subshell of satellites 105 or a second subshell of satellites 105. The first subshell of satellites 105 orbit the Earth in one direction, and the second subshell of satellites orbit the Earth in a different direction. Examples of a first subshell (e.g., subshell A) and a second subshell (e.g., subshell B) are described with respect to FIGS. 1-4. For example, satellites 105A in the first subshell may be moving along a northbound (e.g., NE or NW) portion of their respective orbits 110A, and satellites 105B in the second subshell may be moving along a southbound (e.g., SE or SW) portion of their respective orbits 110B. The selection of subshell can affect the number of hops from the source to the destination. Thus, selection of subshell can be made to minimize the number of hops or otherwise optimize end-to-end QoS. Also, connectivity between satellites 105/hops is typically better when the satellites 105 are located in the same subshell.

Figure 6:
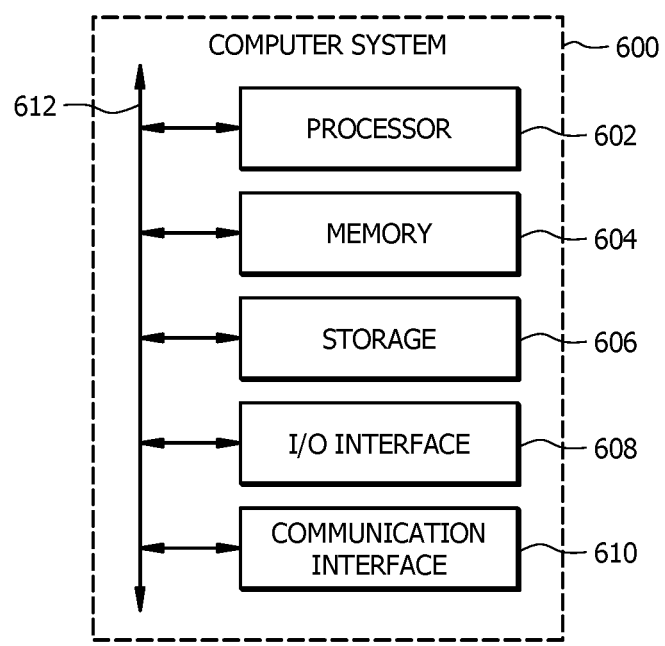
FIG. 6 illustrates an example of a computer system, in accordance with certain embodiments.

Reference is now made to FIG. 6, wherein is shown an example computer system 600 which may be used by the systems and methods described herein. In particular embodiments, one or more computer systems 600 provide functionality described or illustrated herein. As an example, one or more computer systems 600 may be used to provide at least a portion of a satellite 105, a user terminal 115, or a ground station 120 described with respect to FIGS. 1-4. As another example, one or more computer systems 600 may be used to perform one or more steps described with respect to FIG. 5. In particular embodiments, software running on one or more computer systems 600 provides functionality described or illustrated herein or performs one or more steps of one or more methods described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A node, the node comprising:
one or more processors; and
one or more computer-readable non-transitory storage media comprising instructions that, when executed by the one or more processors, cause one or more components of the node to perform operations comprising:
   determining a link quality associated with each satellite link of a plurality of satellite links;
   applying load balancing to the plurality of satellite links, the load balancing based at least in part on the respective link quality associated with each satellite link, wherein the load balancing comprises:
      determining which of the satellite links of the plurality of satellite links to include in an active set, the active set selected to communicate data to or from the node;
      for each satellite link in the active set, determining a weighting factor associated with the respective satellite link, the weighting factor determined based on a plurality of link quality parameters associated with the respective satellite link; and
      for each satellite link in the active set, applying the respective weighting factor to determine a portion of the data to communicate via the respective satellite link; and
   transmitting or receiving the data via the satellite links in the active set, wherein each satellite link in the active set communicates its respective portion of the data.

2. The node of claim 1, wherein:
the node corresponds to a first terrestrial node; and
the active set of satellite links facilitates communication between the first terrestrial node and a second terrestrial node via a path comprising a plurality of satellites;
wherein determining which of the satellite links to include in the active set is based at least in part on an end-to-end link quality associated with the communication between the first terrestrial node and the second terrestrial node.

3. The node of claim 2, wherein:
at least one satellite link in the active set comprises an uplink from the first terrestrial node or the second terrestrial node to an ingress satellite of the plurality of satellites;
at least one satellite link in the active set comprises an inter-satellite link; and
at least one satellite link in the active set comprises a downlink from an egress satellite of the plurality of satellites to the other of the first terrestrial node or the second terrestrial node.

4. The node of claim 1, wherein:
the node corresponds to a first terrestrial node;
the active set of satellite links facilitates communication between the first terrestrial node and a second terrestrial node via a path comprising a plurality of satellites; and
the active set comprises one or more inter-satellite links, the one or more inter-satellite links selected based in part on a number of inter-satellite hops in the path, the number of inter-satellite hops depending on a geometry of the satellites relative to each other.

5. The node of claim 1, wherein:
the plurality of satellite links comprises a first satellite link, and wherein determining whether to include the first satellite link in the active set is based in part on whether the first satellite link is associated with a first subshell of satellites or a second subshell of satellites, the first subshell of satellites orbiting the Earth in one direction and the second subshell of satellites orbiting the Earth in a different direction.

6. The node of claim 1, wherein:
the plurality of satellite links comprises a first satellite link, and wherein determining the link quality associated with the first satellite link is based at least in part on a report received from another node.

7. The node of claim 1, wherein:
the node corresponds to a first terrestrial node; and
the plurality of satellite links comprises a first satellite link, the first satellite link available to connect the first terrestrial node and a first satellite;
wherein determining the link quality associated with the first satellite link comprises determining a downlink quality associated with the first satellite link based on measuring a signal received from the first satellite and determining an uplink quality associated with the first satellite link based on a report indicating a measurement that the first satellite performs on a signal transmitted by the first terrestrial node.

8. The node of claim 7, further comprising:
sending a report indicating at least the downlink quality associated with the first satellite link to a second terrestrial node.

9. The node of claim 1, wherein the plurality of satellite links comprises a first satellite link and wherein applying the load balancing to the first satellite link comprises:
adding the first satellite link to the active set when the link quality associated with the first satellite link satisfies a first threshold; and
removing the first satellite link from the active set when the link quality fails to satisfy a second threshold.

10. The node of claim 1, wherein each link quality parameter of the plurality of link quality parameters is weighted according to a respective weighting coefficient.

11. A method performed by a node, the method comprising:
determining a link quality associated with each satellite link of a plurality of satellite links;
applying load balancing to the plurality of satellite links, the load balancing based at least in part on the respective link quality associated with each satellite link, wherein the load balancing comprises:
   determining which of the satellite links of the plurality of satellite links to include in an active set, the active set selected to communicate data to or from the node;
   for each satellite link in the active set, determining a weighting factor associated with the respective satellite link, the weighting factor determined based on a plurality of link quality parameters associated with the respective satellite link; and
   for each satellite link in the active set, applying the respective weighting factor to determine a portion of the data to communicate via the respective satellite link; and
transmitting or receiving the data via the satellite links in the active set, wherein each satellite link in the active set communicates its respective portion of the data.

12. The method of claim 11, wherein:
the node corresponds to a first terrestrial node; and
the active set of satellite links facilitates communication between the first terrestrial node and a second terrestrial node via a path comprising a plurality of satellites;
wherein determining which of the satellite links to include in the active set is based at least in part on an end-to-end link quality associated with the communication between the first terrestrial node and the second terrestrial node.

13. The method of claim 11, wherein:
the node corresponds to a first terrestrial node;
the active set of satellite links facilitates communication between the first terrestrial node and a second terrestrial node via a path comprising a plurality of satellites; and
the active set comprises one or more inter-satellite links, the one or more inter-satellite links selected based in part on a number of inter-satellite hops in the path, the number of inter-satellite hops depending on a geometry of the satellites relative to each other.

14. The method of claim 11, wherein:
the plurality of satellite links comprises a first satellite link, and wherein determining whether to include the first satellite link in the active set is based in part on whether the first satellite link is associated with a first subshell of satellites or a second subshell of satellites, the first subshell of satellites orbiting the Earth in one direction and the second subshell of satellites orbiting the Earth in a different direction.

15. The method of claim 11, wherein:
the node corresponds to a first terrestrial node; and
the plurality of satellite links comprises a first satellite link, the first satellite link available to connect the first terrestrial node and a first satellite;
wherein determining the link quality associated with the first satellite link comprises determining a downlink quality associated with the first satellite link based on measuring a signal received from the first satellite and determining an uplink quality associated with the first satellite link based on a report indicating a measurement that the first satellite performs on a signal transmitted by the first terrestrial node.

16. One or more computer-readable non-transitory storage media embodying instructions that, when executed by a processor of a node, cause the performance of operations comprising:
determining a link quality associated with each satellite link of a plurality of satellite links;
applying load balancing to the plurality of satellite links, the load balancing based at least in part on the respective link quality associated with each satellite link, wherein the load balancing comprises:
determining which of the satellite links of the plurality of satellite links to include in an active set, the active set selected to communicate data to or from the node;
for each satellite link in the active set, determining a weighting factor associated with the respective satellite link, the weighting factor determined based on a plurality of link quality parameters associated with the respective satellite link; and
for each satellite link in the active set, applying the respective weighting factor to determine a portion of the data to communicate via the respective satellite link; and
transmitting or receiving the data via the satellite links in the active set, wherein each satellite link in the active set communicates its respective portion of the data.

17. The one or more computer-readable non-transitory storage media of claim 16, wherein:
the node corresponds to a first terrestrial node; and
the active set of satellite links facilitates communication between the first terrestrial node and a second terrestrial node via a path comprising a plurality of satellites;
wherein determining which of the satellite links to include in the active set is based at least in part on an end-to-end link quality associated with the communication between the first terrestrial node and the second terrestrial node.

18. The one or more computer-readable non-transitory storage media of claim 16, wherein:
the node corresponds to a first terrestrial node;
the active set of satellite links facilitates communication between the first terrestrial node and a second terrestrial node via a path comprising a plurality of satellites; and
the active set comprises one or more inter-satellite links, the one or more inter-satellite links selected based in part on a number of inter-satellite hops in the path, the number of inter-satellite hops depending on a geometry of the satellites relative to each other.

19. The one or more computer-readable non-transitory storage media of claim 16, wherein:
the plurality of satellite links comprises a first satellite link, and wherein determining whether to include the first satellite link in the active set is based in part on whether the first satellite link is associated with a first subshell of satellites or a second subshell of satellites, the first subshell of satellites orbiting the Earth in one direction and the second subshell of satellites orbiting the Earth in a different direction.

20. The one or more computer-readable non-transitory storage media of claim 16, wherein:
the node corresponds to a first terrestrial node; and
the plurality of satellite links comprises a first satellite link, the first satellite link available to connect the first terrestrial node and a first satellite;
wherein determining the link quality associated with the first satellite link comprises determining a downlink quality associated with the first satellite link based on measuring a signal received from the first satellite and determining an uplink quality associated with the first satellite link based on a report indicating a measurement that the first satellite performs on a signal transmitted by the first terrestrial node.

* * * * *